UNITED STATES PATENT OFFICE.

ARMILDA E. THOMPSON, OF ST. JAMES, MISSOURI.

FOOD COMPOUND.

1,174,203.     Specification of Letters Patent.     Patented Mar. 7, 1916.

No Drawing.     Application filed July 31, 1914.     Serial No. 854,375.

*To all whom it may concern:*

Be it known that I, ARMILDA E. THOMPSON, citizen of the United States, residing at St. James, in the county of Phelps and State of Missouri, have invented certain new and useful Improvements in Food Compounds, of which the following is a specification.

My invention relates to improvements in food compounds.

The primary object of my invention is to prepare a food compound comprising such ingredients as will provide an easily digestible and very nutritious substance to sustain the human body.

With this and other objects in view my invention contemplates such advantageous features as will hereinafter appear and be set forth in the appended claims.

The preferred embodiment of my invention consists in the provision of one part white corn ground very fine and bolted as a basic substance, to this is added one quarter part of corn starch, the two ingredients are then mixed together and form the composition of my invention *per se*.

When it is desired to use my composition as a breakfast food or for any other purpose I have found it desirable to mix with the corn and corn starch, sufficient cold water to reduce the same to a viscid state whereupon salt is added in sufficient quantities to season the same to any degree desired by the user. This preparation having been attained the entirety is cooked for a sufficient length of time to prepare the same as a proper food diet.

I have found that the corn meal and corn starch tend to strengthen and build up the tissues of the body. While the composition as a whole tends to impart a laxative condition to the system, the preparation is wholesome and nutritious and very healthful.

What I claim to be new is:—

1. A cereal food consisting of a mixture of pulverulent white corn and corn starch.

2. A cereal food consisting of a mixture of one part pulverulent bolted white corn meal and one quarter part corn starch.

In testimony whereof I affix my signature in presence of two witnesses.

ARMILDA E. THOMPSON.

Witnesses:
    B. F. THOMPSON,
    G. W. THOMPSON.